April 20, 1954
T. R. SCHLITZ
2,676,220
VEHICLE SIGNAL SWITCH
Filed May 23, 1951
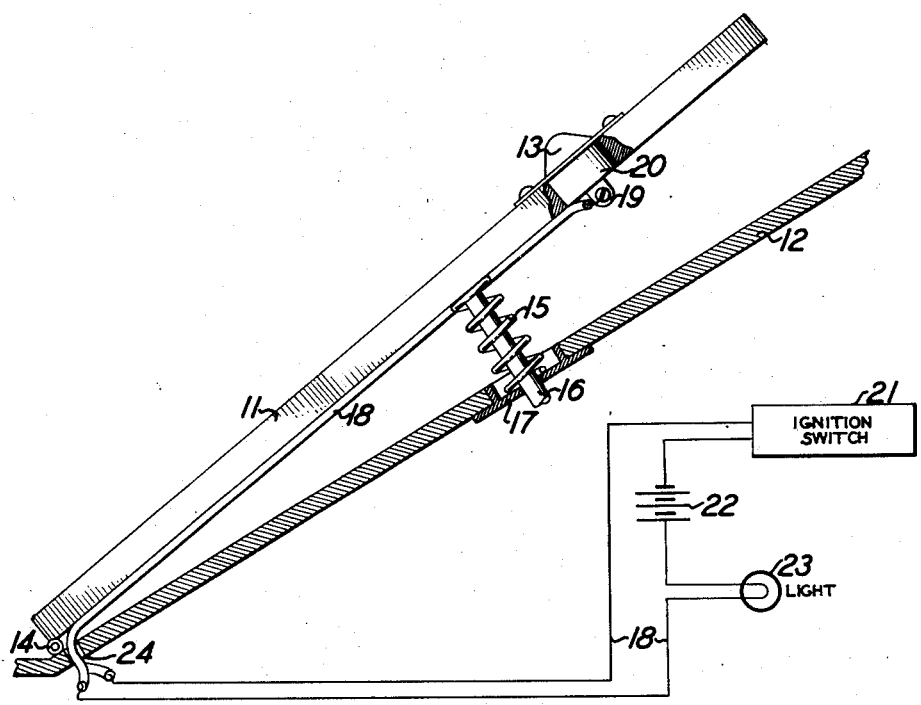
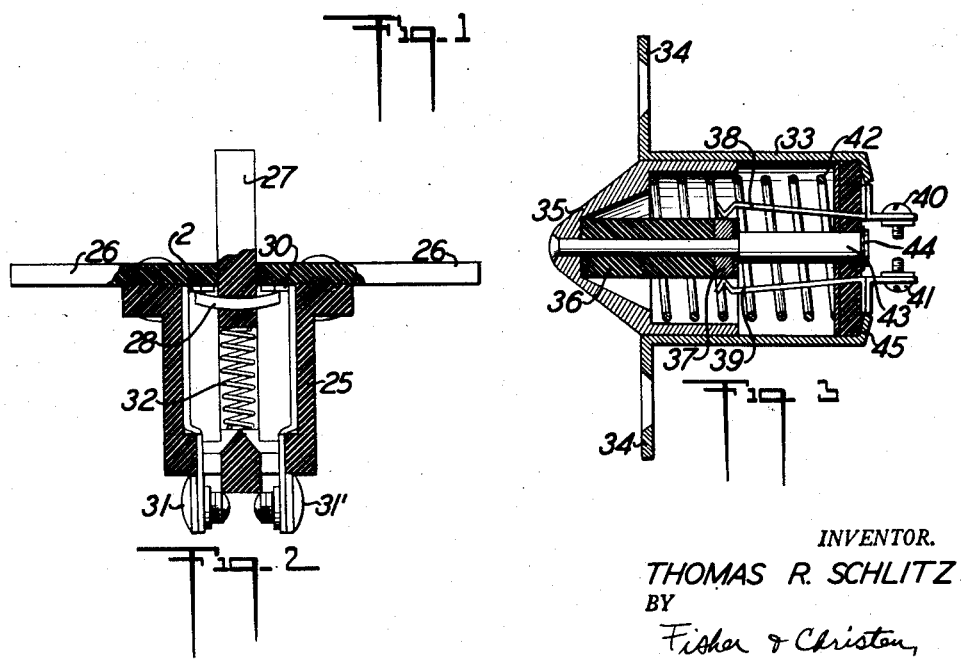
INVENTOR.
THOMAS R. SCHLITZ
BY
Fisher & Christen,
ATTORNEYS.

Patented Apr. 20, 1954

2,676,220

UNITED STATES PATENT OFFICE 2,676,220

VEHICLE SIGNAL SWITCH

Thomas R. Schlitz, Hillside, N. J.

Application May 23, 1951, Serial No. 227,869

1 Claim. (Cl. 200—61.89)

This invention relates to signalling apparatus for motor driven vehicles and more particularly to signalling means by which a warning is given of the deceleration of the vehicle.

It is well known that many vehicle collisions occur because of insufficient warning being given to the driver of a trailing vehicle of the intention of the driver of the preceding vehicle to decelerate or stop. Vehicles are customarily equipped with a stop light device which is operated by application of pressure to the brake pedal. Such a warning system is often inadequate however, particularly when vehicles are travelling at high speeds. There is an interval between the time the driver removes his foot from the accelerator pedal and places it on the brake pedal, during which interval the vehicle may decelerate to such an extent that a trailing vehicle will collide with it. In vehicles equipped with a stop light alone, no warning is given to the driver of a trailing vehicle of the deceleration during this interval.

It is an object of my invention therefore to warn the driver of a trailing vehicle of the deceleration of a preceding vehicle during the interval between the removal of the driver's foot from the accelerator pedal and the application of the brakes of such vehicle.

A further object of my invention is to provide an apparatus for signalling the deceleration of a motor vehicle which is simple of construction, economical of manufacture and readily attachable to any motor vehicle.

Another object of my invention is to provide a switch mechanism for operating a warning signal which can be manufactured as a complete unit and requires no modification of the existing structure of motor vehicles for attachment.

Still a further object of my invention is to provide a warning signal apparatus which is controlled solely by the action of the accelerator pedal.

I accomplish the above and other objects of my invention by providing an accelerator pedal for a motor vehicle having a normally closed spring controlled switch carried near the end of the accelerator pedal, said switch being held open by the pressure of the foot thereon, whereby relaxation of pressure on the accelerator pedal will release said spring controlled switch to effect the closing of a lamp circuit which signals the deceleration of the vehicle to a trailing vehicle.

Other features of my invention include a manually controlled switch in the lamp circuit to deenergize the lamp when the vehicle is not in use and the use of the stop light with which vehicles are normally equipped as the signalling lamp.

In the drawings:

Fig. 1 is a view in elevation of an accelerator pedal and switch embodying the features of my invention, including a schematic diagram of the electrical circuit employed.

Fig. 2 is a cross-sectional view of one form of switch which I may employ in my invention.

Fig. 3 is a view, partly in section and partly in elevation, of another form of a switch which I may employ.

Referring to the drawings in detail, the vehicle floor is indicated generally at 12, having an accelerator pedal 11 pivotally fastened thereto at 14. A switch shown generally at 20 is suitably secured near the front end of the accelerator pedal 11. Switch terminals 19, only one of which is shown, are connected to wires 18, only one of which is shown in elevation which form part of the electrical circuit. The wires 18 are led through the vehicle floor 12 as at 24.

An actuating element 13 of switch 20 projects above the top surface of the accelerator pedal 11 to be contacted by the foot of the driver. The accelerator pedal 11 is attached to throttling arm 16 which extends through the floor 12. The accelerator pedal is urged away from the floor 12 by spring 15 suitably held to the floor as at 17.

The electrical circuit includes a source of electrical energy 22 which may be the vehicle battery, a manual switch, preferably the ignition switch of the vehicle, indicated generally at 21, and a signal lamp 23, which may be the usual vehicle stop light, although a separate signal lamp may be employed.

In Fig. 2, showing a suitable form of switch, 25 indicates the switch casing having suitable mounting flanges 26 for securing the switch to the accelerator pedal 11. A switch actuating element indicated at 27 has a conductor 28 fastened thereto for closing the circuit between contacts 29 and 30 which are in electrical connection with terminals 31 and 31', respectively. The switch is held normally closed as shown in the drawing by means of a spring 32 between actuating member 27 and the bottom of the casing 25. Pressure on member 27 compresses spring 32 and breaks the circuit between conductor 28 and contacts 29 and 30.

The switch shown in Fig. 3 includes a casing 33 having mounting flanges 34. Actuating element 35 carries a cylindrical insulating member 36 having a conducting portion 37 to engage contacts 38 and 39 which are connected to terminals 40 and 41 respectively. The switch is held in the closed position as shown in the drawing by spring 42. The application of pressure to member 35 compresses spring 42 and moves insulating cylinder 36 between contacts 38 and 39, thereby breaking the circuit. The members 35 and 36 are held against further outward movement by washer 44 on the cylinder 43 abutting bottom member 45 of the switch.

In operation, the switch actuating member 13 is depressed by the foot of the driver while the vehicle is driven at speeds requiring the use of the accelerator pedal. The actuating member 13 may be of any suitable shape, as for example those denoted by 27 and 35, or I may employ a member which extends laterally across the accelerator pedal. When it becomes necessary or desirable to reduce the speed of the vehicle, the driver's foot is lifted from the accelerator pedal, thereby closing the switch to energize the signal lamp, preferably the stop light of the vehicle.

The spring controlling the switch, for example, those indicated at 32 and 42, offers less resistance to deformity than the accelerator pedal spring 15. This permits the driver to lift his toe to flash the warning light prior to the removal of the driver's foot from the accelerator pedal. The difference in resistance to deformity of the aforementioned springs assures that the switch will be held open by the foot of the driver irrespective of the amount of foot pressure on the accelerator pedal. The cooperation of the switch spring and the accelerator pedal spring permits the driver to signal deceleration of the vehicle positively and instantaneously at any speed from full throttle down to the lowest speeds without interfering with the normal function of the accelerator mechanism.

Whenever the switch 21, which is preferably the ignition switch of the vehicle, is closed and the accelerator pedal is not contacted by the driver's foot, the signal lamp 23 will be energized. Additionally, this serves to indicate when the ignition switch has inadvertently been left in the closed position when the vehicle is not in use.

From the foregoing description it is apparent that my invention provides an accelerator pedal and switch mechanism which can be easily assembled and distributed as a unit for replacement of the usual accelerator pedal of a vehicle. The mechanism provides an effective signal means to warn of the deceleration of the vehicle and thereby prevent accidents.

Although I have shown and described in detail two switches suitable for use in my invention, it is to be understood that any other suitable form of normally closed spring controlled switch may be employed.

While I have described my invention in its preferred embodiments, the foregoing disclosure is to be regarded as descriptive only and not as restricting or limiting my invention. Further embodiments and modifications may be constructed without departing from the spirit and scope of the invention as set forth in the appended claim.

I claim:

In combination, an accelerator pedal pivoted at one end to the top surface of the floor of a vehicle, said pedal having an aperture therein adjacent the other end thereof, a spring substantially winding between the ends of said pedal for urging the apertured end of the pedal outwardly from the floor of the vehicle, a switch positioned within the aperture of said accelerator pedal, said switch including a casing having outwardly extending flanges bearing against and secured to said accelerator pedal, contact-making terminals in said casing, said terminals extending through the bottom of said casing and each having means for making electrical connection therewith, a foot actuated member positioned in said casing and extending through the accelerator pedal aperture and projecting above the upper surface of the pedal and cooperating with said terminals to make or break contact, and a spring for urging said foot-operated member and said terminals to circuit closing position, the spring for urging the accelerator pedal outwardly from the floor of the vehicle being substantially stronger than the spring for urging said switch terminals to closed circuit position, whereby the switch will be held open at all foot pressures on said pedal.

References Cited in the file of this patent
UNITED STATES PATENTS

| Number | Name | Date |
|---|---|---|
| 1,641,099 | Shuster | Aug. 30, 1927 |
| 1,670,050 | Simons | May 15, 1928 |
| 1,760,212 | Ruble | May 27, 1930 |
| 1,956,056 | Bellec et al. | Apr. 24, 1934 |
| 2,096,069 | Seiden | Oct. 19, 1937 |
| 2,128,769 | Finnell | Aug. 30, 1938 |
| 2,195,776 | Geisheimer | Apr. 2, 1940 |
| 2,435,389 | Good | Feb. 3, 1948 |